US008671672B2

(12) United States Patent
Wang et al.

(10) Patent No.: US 8,671,672 B2
(45) Date of Patent: Mar. 18, 2014

(54) PNEUMATIC ACTUATOR STRUCTURE

(75) Inventors: James Wang, Taichung (TW); Yung-Chuan Chen, Da-an Township, Taichung County (TW)

(73) Assignee: Easy Tork Automation Corporation, Yong Wun Village (TW)

( * ) Notice: Subject to any disclaimer, the term of this patent is extended or adjusted under 35 U.S.C. 154(b) by 774 days.

(21) Appl. No.: 12/993,504

(22) PCT Filed: Nov. 20, 2009

(86) PCT No.: PCT/CN2009/075067
§ 371 (c)(1), (2), (4) Date: Nov. 19, 2010

(87) PCT Pub. No.: WO2011/060587
PCT Pub. Date: May 26, 2011

(65) Prior Publication Data
US 2011/0226124 A1 Sep. 22, 2011

(51) Int. Cl.
*F16D 31/02* (2006.01)

(52) U.S. Cl.
USPC .................................. 60/407; 60/413; 92/121

(58) Field of Classification Search
USPC ................... 60/404, 406, 407, 409, 410, 413; 92/120, 121
See application file for complete search history.

(56) References Cited

U.S. PATENT DOCUMENTS 4,275,642 A * 6/1981 Smith ............................. 91/415
2007/0034079 A1 2/2007 Gardner

FOREIGN PATENT DOCUMENTS

CN 1369618 A 9/2002

* cited by examiner

*Primary Examiner* — Edward Look
*Assistant Examiner* — Logan Kraft
(74) *Attorney, Agent, or Firm* — Alan Kamrath; Kamrath IP Lawfirm, P.A.

(57) ABSTRACT

An actuator structure includes two half cylinders made respectively from the same mold and the two half cylinders engaged with each other to form an actuator. The actuator has an air reservoir chamber and a vane chamber dividing by a dividing unit, and the vane chamber has a vane inside. An O-shaped ring is formed around the vane and an elastic stopping edge is formed protrudingly from the O-shaped ring and linearly contacted an inner surface of the actuator. The volume ratio of the air reservoir chamber and the vane chamber is about three to one, and a channel groove is formed at an interface of the two half cylinders to connect an air inlet hole and a left side and a right side wall of the actuator. A fail-safe or dual-movement control structure is formed to control the direction of air supply to drive the shaft to rotate toward a predetermined direction, or utilizing the compressed air in the air reservoir chamber to force the vane to restore to its original position.

8 Claims, 8 Drawing Sheets

PNEUMATIC ACTUATOR STRUCTURE

FIELD OF THE INVENTION

This invention relates to a technical field of pneumatic actuator, and more particularly to an improved actuator structure which forms an air reservoir chamber as one piece and the air reservoir chamber can ensure a vane to restore safely when an air source does not provide air.

BACKGROUND OF THE INVENTION

Conventional actuators include columnar actuators and vane-shaped actuators which both utilize air pressure or mechanical spring to cause a shaft to rotate, and further control the shaft to move reciprocatingly to drive a valve body to open or close. Also, a single-action actuator is usually used on a valve body which is usually closed to ensure safety when the actuator is in use.

However, if the conventional single-action actuator uses a spring's resilient force to provide its returning force, the spring has to be installed under a predetermined pressure such that the spring can apply pressure on the shaft even when the spring has been deformed to its returning limit, and if air pressure has to compress the spring, the air pressure has to be increased to a substantially high level. However, the spring may suddenly release pressure to cause the driver of the shaft to violently strike against the actuator and restricting screws, so the actuator structure has to be rigid. Also, the user has to consider several factors of the spring, such as wire diameter, spiral angel, material, thermal treatment, and enhancement of reliability and durability, so it is difficult to design and install the spring.

SUMMARY OF THE INVENTION

The technical problem the present invention tries to solve is: if the conventional single-action actuator uses a spring to provide its returning force, the spring has to be installed under a predetermined pressure so the spring can apply pressure on the shaft even when the spring has reached its returning limit, and air pressure has to be high enough to compress the spring. However, the spring may suddenly releases pressure to cause the driver of the shaft to violently strike against the actuator and restricting screws, so the actuator structure has to be rigid, and it is difficult to design and install the spring.

The technical point to solve the above-mentioned problem in the present invention is to provide an actuator structure, including:

a first-half cylinder;

a second-half cylinder, wherein the first-half cylinder and the second-half cylinder are formed respectively in the same mold and when the first-half cylinder and the second-half cylinder are engaged with each other, a complete actuator is formed. Each of the first-half cylinder and the second-half cylinder has an air reservoir chamber and a vane chamber, wherein a dividing unit is formed between the air reservoir chamber and the vane chamber, and the dividing unit forms an angle of between 110 and 130 degrees in the vane chamber which has protruding arc portions to reduce the volume and focus the effective moving area of the vane on one of the blades thereof. The vane is inside the vane chamber. A first channel groove and a second channel groove are formed at an interface of the first-half cylinder and the second-half cylinder, to connect a first air inlet hole and a second air inlet hole (at periphery of the first-half cylinder and the second-half cylinder), and a left-side wall and a right-side wall of the vane chamber. One or more grooves for a O-shaped ring to prevent leakage are formed at a surface of the vane, both sides of a vane axis and a lateral surface of the vane axis closed to the dividing unit; and a fail-safe control structure, including an air source connected to a non-return valve and a first control side of an air driving valve. The non-return valve is connected to the air reservoir chamber of the actuator, and the air reservoir chamber containing high-pressure gas is connected to an air inlet end of the air driving valve. The air driving valve has a second control side which has a spring. A first output end of the air driving valve is connected to a second air inlet hole of the actuator through a first channel and connected to a right-side wall of the vane chamber through the second channel groove, while a second output end of the air driving valve is connected to a first air inlet hole of the actuator through a second channel and connected to a left-side wall of the vane chamber through the first channel groove. The air source provides air to drive the air driving valve and the vane, and when the air source does not provide air, the spring rebounds to actuate the air driving valve. By switching movement to change the inlet air position, the high-pressure air in the air reservoir chamber can drive the vane and safely restore it, wherein screws are passed through an outer periphery of the first-half cylinder and the second-half cylinder. The screws can penetrate the vane chamber, and a front end of each screw is used to block the vane to control a rotating angle of the vane, wherein an outer portion of the O-shaped ring, which is located at a peripheral surface of the vane, has two elastic stopping edges towards two free ends. These two stopping edges are located at the inner surface of the actuator by utilizing means of line contact erosion, and wherein the volume ratio of the air reservoir chamber and the vane chamber is three to one.

In another embodiment, an actuator structure includes:

a first-half cylinder;

a second-half cylinder, wherein the first-half cylinder and the second-half cylinder are formed respectively in the same mold and when the first-half cylinder and the second-half cylinder are engaged with each other, a complete actuator is formed. Each of the first-half cylinder and the second-half cylinder has an air reservoir chamber and a vane chamber, wherein a dividing unit is formed between the air reservoir chamber and the vane chamber, and the dividing unit forms an angle of between 110 and 130 degrees in the vane chamber which has protruding arc portions to reduce the volume and focus the effective moving area of the vane on one of the blades thereof. The vane is inside the vane chamber. A first channel groove and a second channel groove are formed at an interface of the first-half cylinder and the second-half cylinder, to connect a first air inlet hole and a second air inlet hole (at periphery of the first-half cylinder and the second-half cylinder), and a left-side wall and a right-side wall of the vane chamber. One or more grooves for a O-shaped ring to prevent leakage are formed at a surface of the vane, both sides of a vane axis and a lateral surface of the vane axis closed to the dividing unit; and a dual-movement control structure, including an air source connected to an air inlet end of an electro-magnetic valve and movement of the electro-magnetic valve is controlled by electro-magnetic valve units, wherein a first outlet end of the electro-magnetic valve is connected to the second air inlet hole of the actuator through a first channel and to a right-side wall of the vane chamber through the second channel groove, while a second outlet end of the electro-magnetic valve is connected to the first air inlet hole of the actuator through a second channel and to a left-side wall of the vane chamber through the first channel groove. When the air source provides air and the electro-magnetic valve unit is actuated, the electro-magnetic valve can be moved and the air can from the air source cause the shaft to rotate. When the electro-magnetic valve unit is actuated in an opposite direction, the electro-magnetic valve is moved and the high-pressure air (from the air source) can drive the vane to restore to its original position, wherein screws are passed through an outer periphery of the first-half cylinder and the second-half cylinder. The screws can penetrate the vane chamber, and a front end of each screw is used to block the vane to control a rotating angle of the vane, wherein an outer portion of the O-shaped ring, which is located at a peripheral surface of the vane, has two elastic stopping edges towards two free ends. These two stopping edges are located at the inner surface of the actuator by utilizing means of line contact erosion, and wherein the volume ratio of the air reservoir chamber and the vane chamber is three to one.

Comparing with conventional techniques, the technical effort of the present invention is that the actuator in the present invention is made by two half cylinders with one mold, so the cost is lower. Also, the cylinder has an air reservoir chamber and a vane chamber inside, and a "fail-safe" control structure to control the high-pressure air in the air reservoir chamber to provide driving force to the vane, which has a larger effective actuation area focusing on one blade of the vane. The vane also has an elastic O-shaped ring with stopping edges which linearly contact with the inner wall of the actuator to provide better effect to prevent leakage.

The present invention together with the above and other advantages may best be understood from the following detailed description of the embodiments of the invention illustrated in the drawings below.

BRIEF DESCRIPTION OF THE DRAWINGS

FIG. 4-1 illustrates a schematic view of the "fail-safe" movement in the present invention.

FIG. 6-1 illustrates a schematic view of the dual-movement actuator when the electro-magnetic unit is not yet actuated.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications which might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
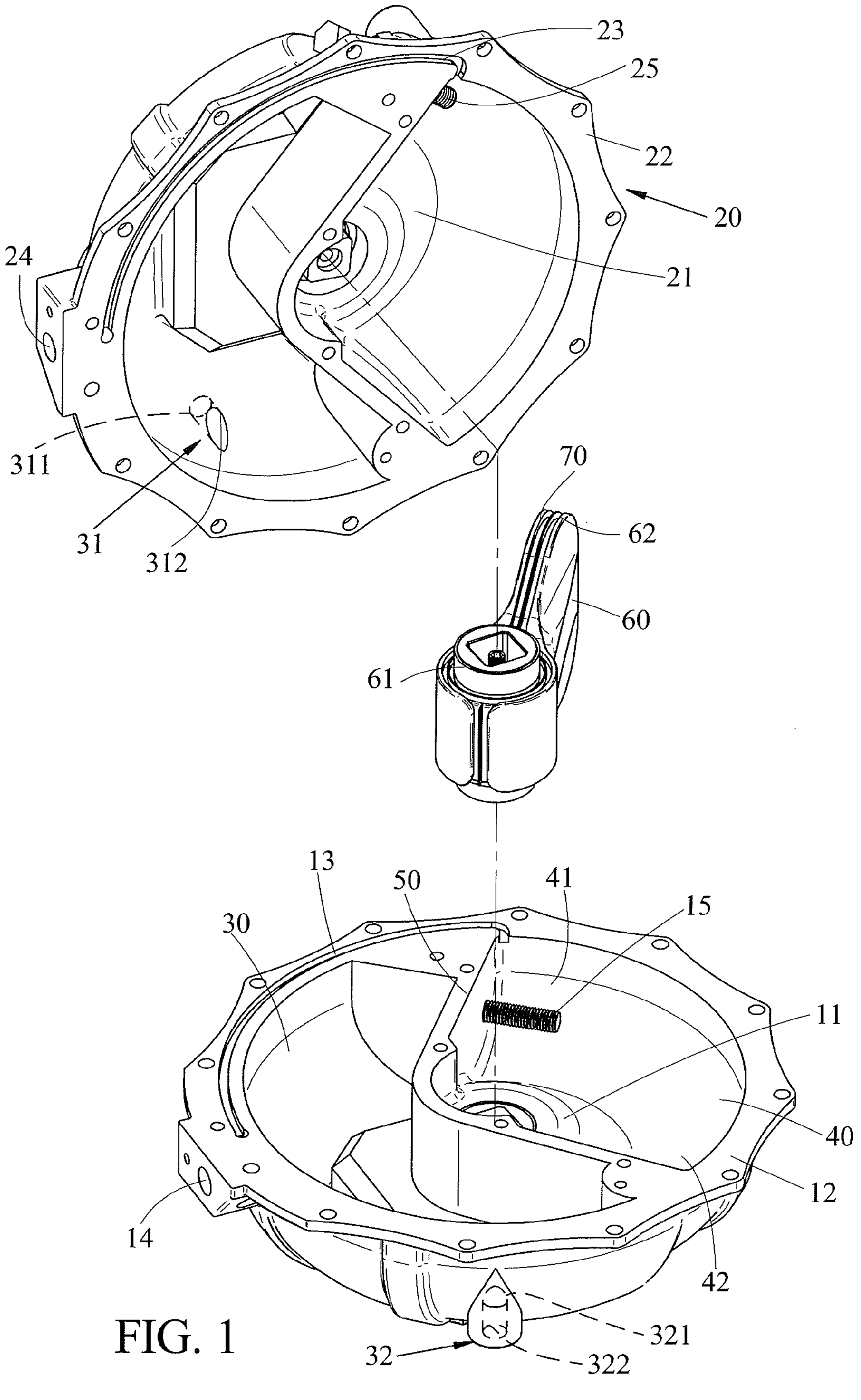
FIG. 1 illustrates a three-dimensional and exploded view of one embodiment in the present invention.
Figure 2:
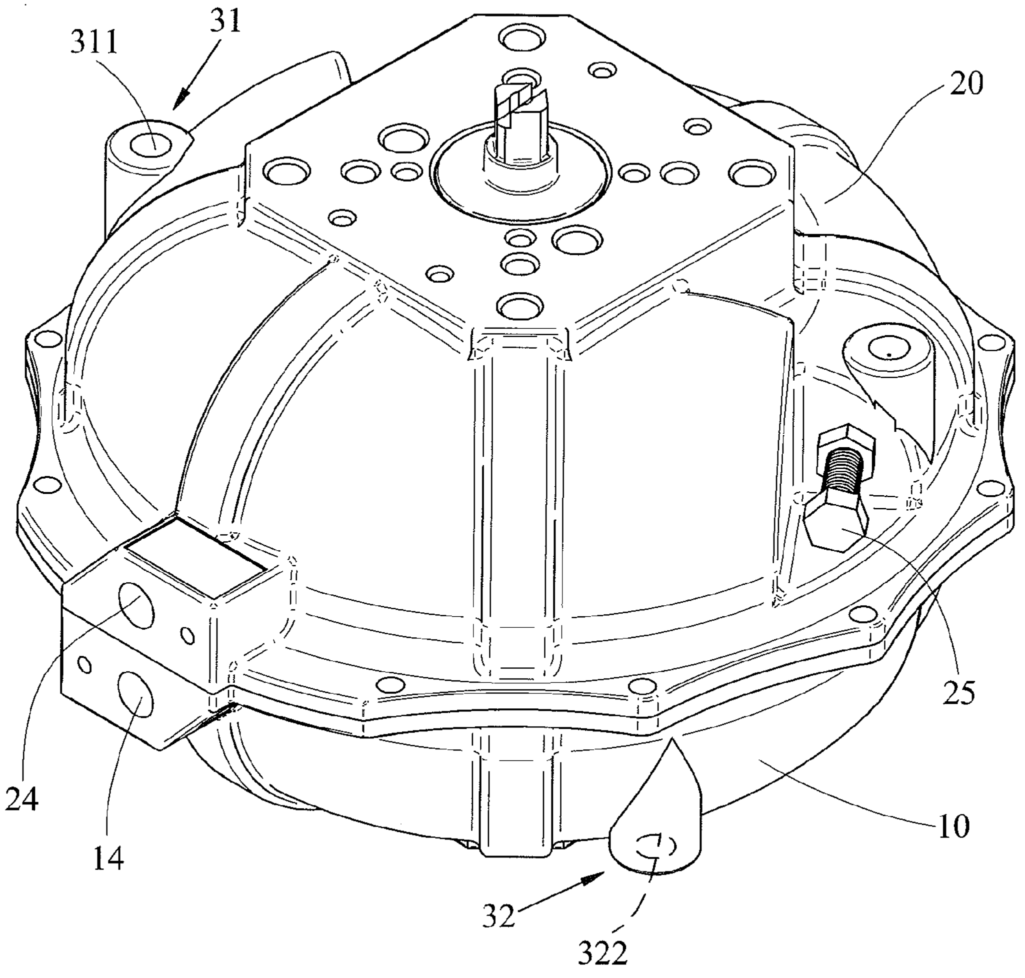
FIG. 2 is a schematic and three-dimensional view of one embodiment in the present invention.
Figure 3:
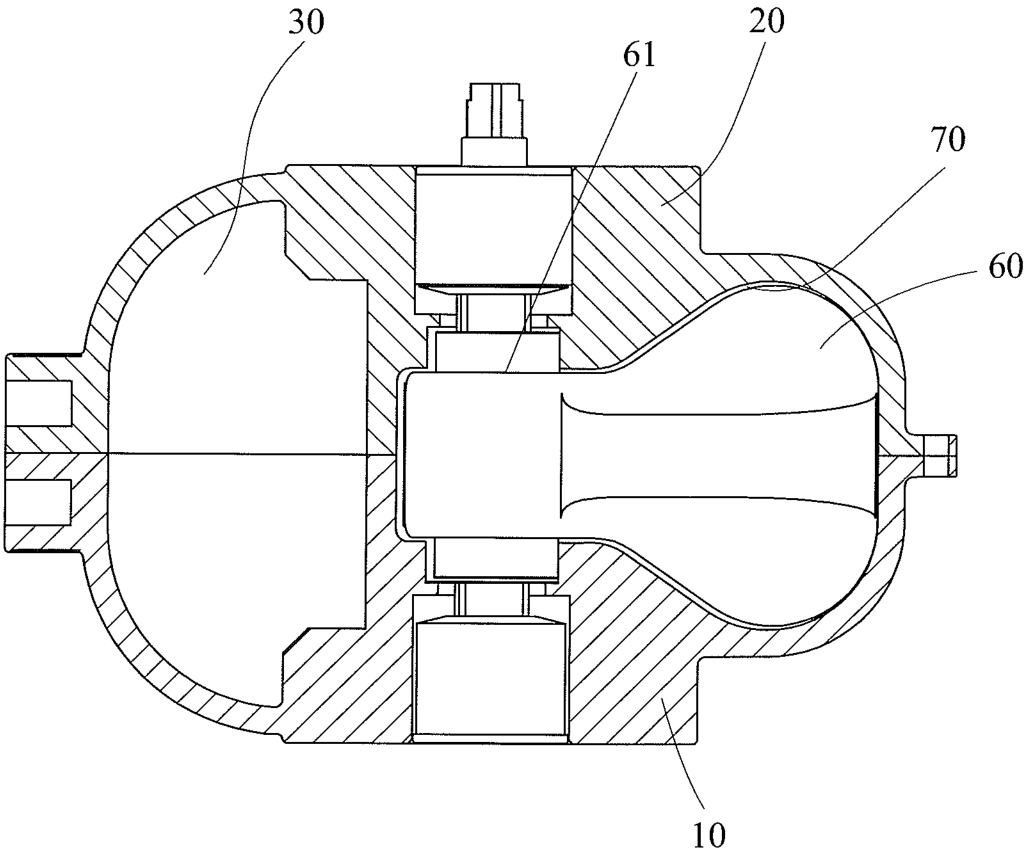
FIG. 3 is a sectional view of one embodiment in the present invention.
Figure 4:
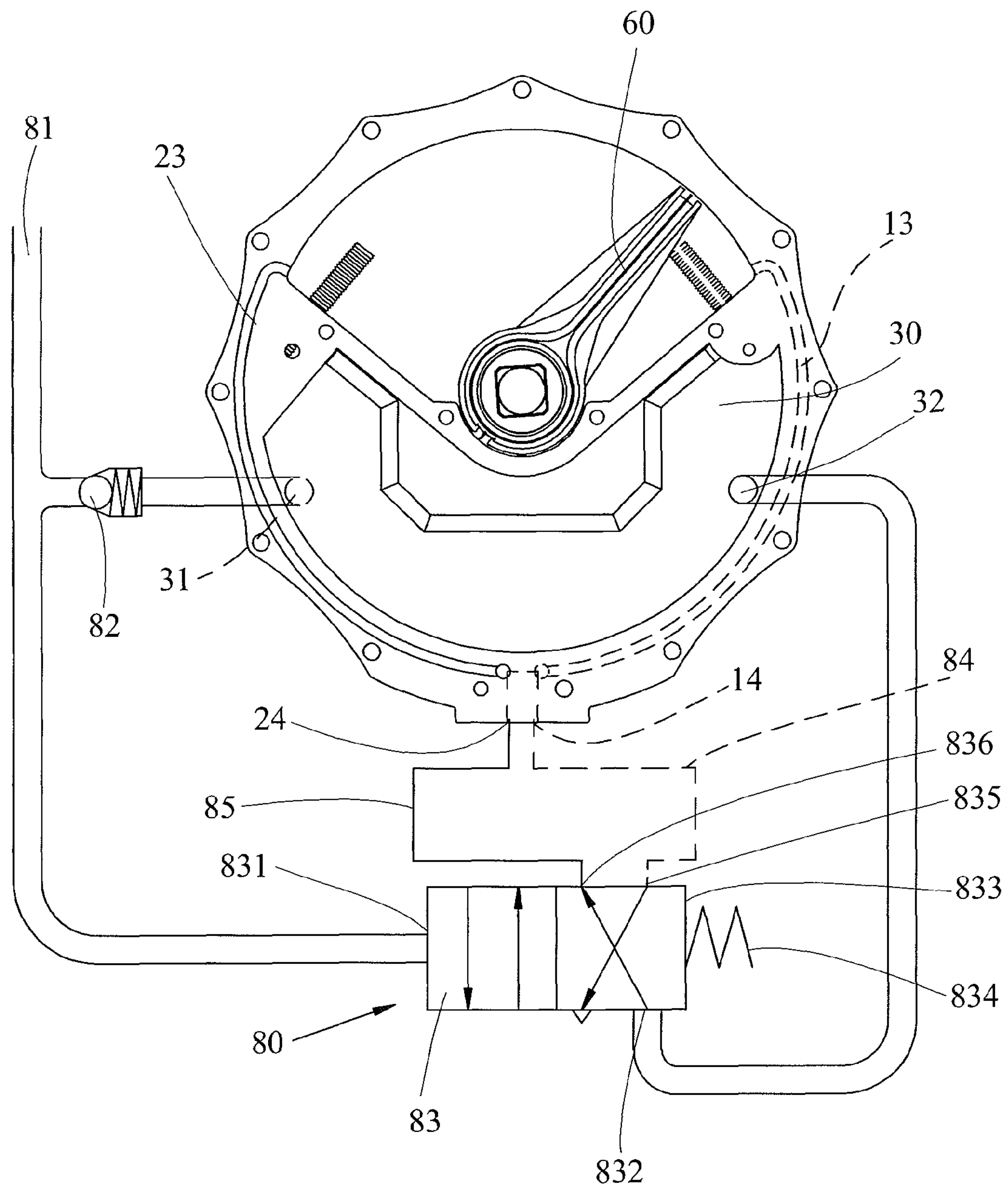
FIG. 4 depicts a schematic view of a "fail-safe" air providing movement of an air source in the present invention.
Figures 1, 4:
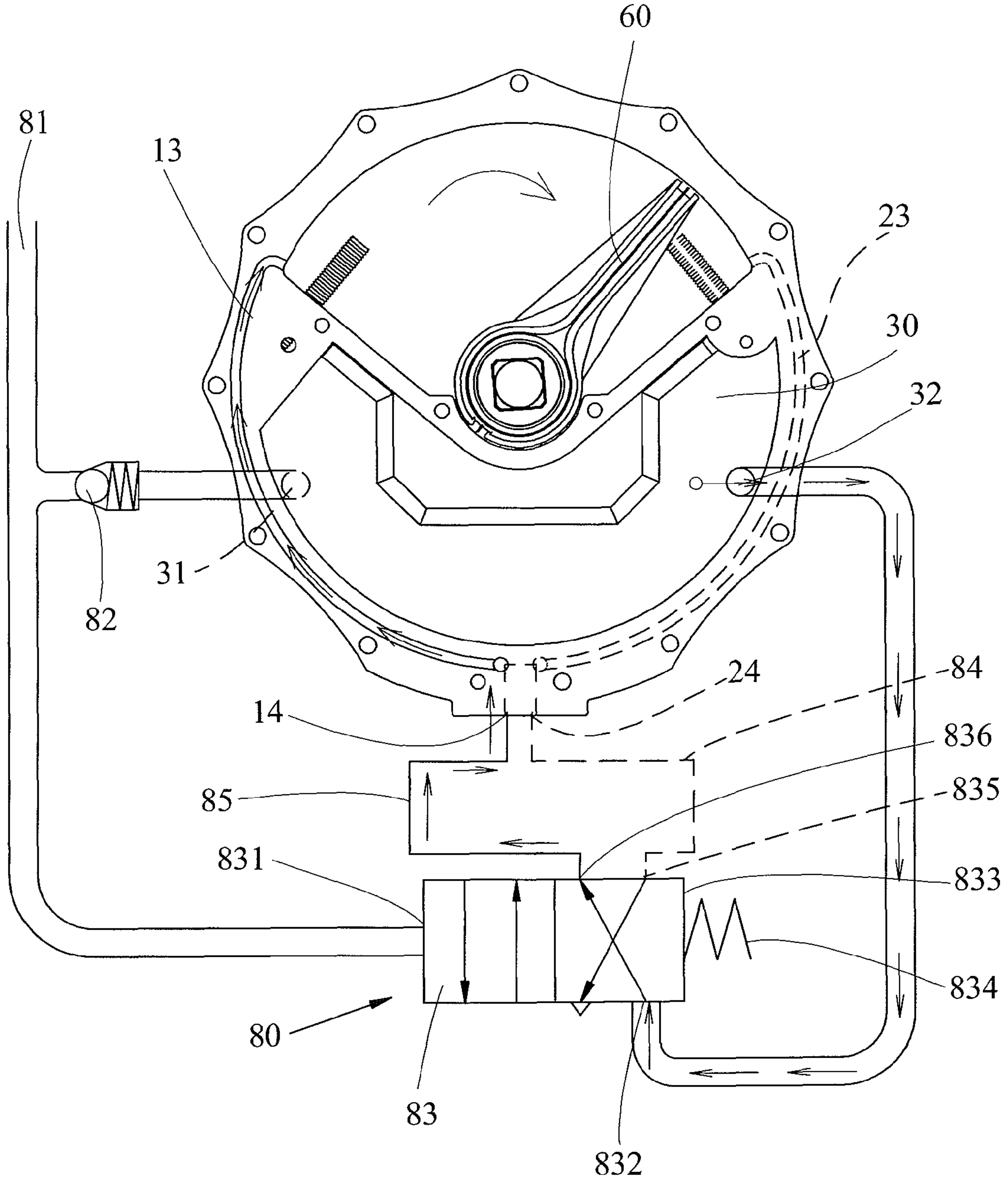
Figure 5:
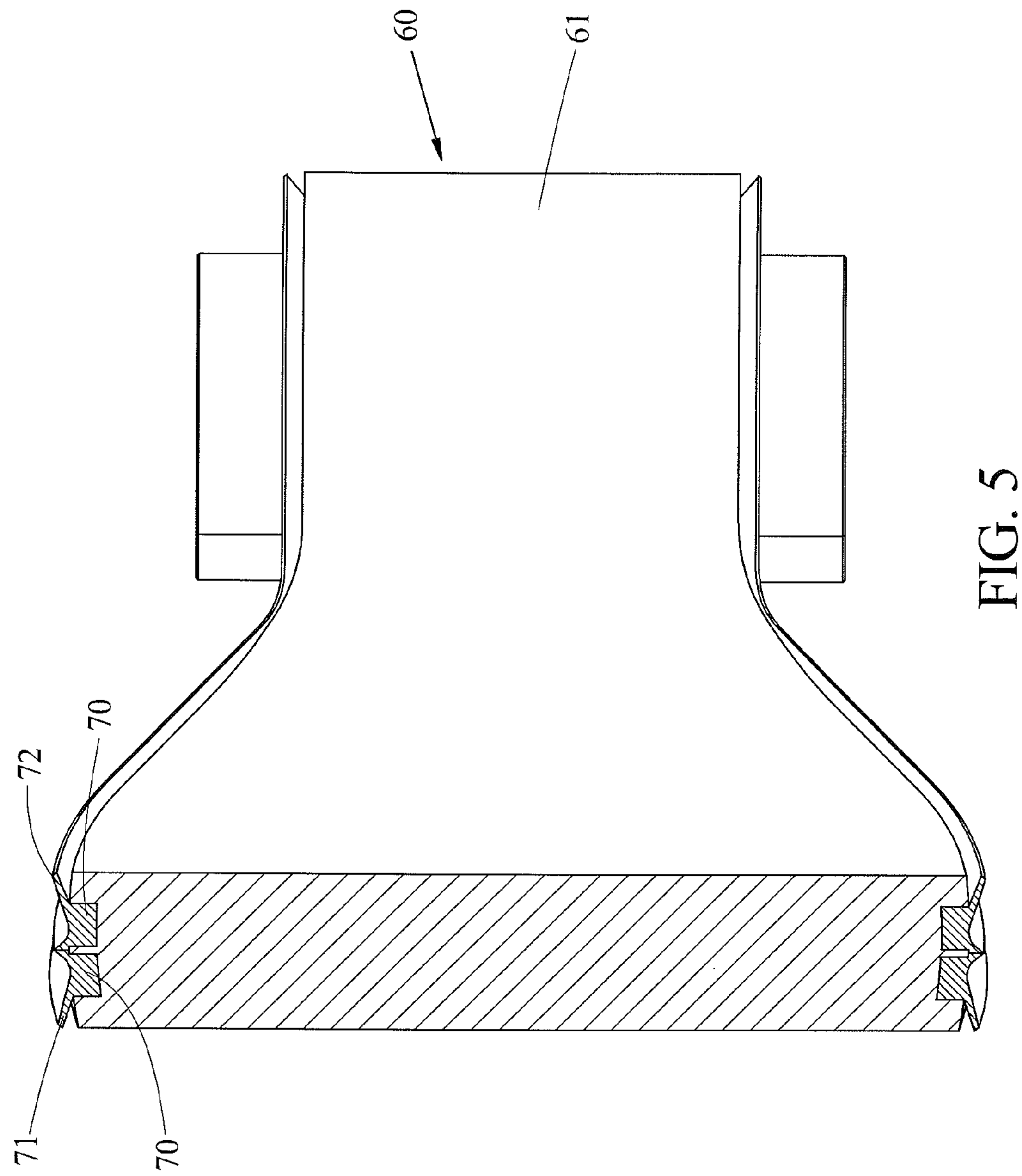
FIG. 5 illustrates a partial sectional view of a vane in the present invention.

Referring to FIGS. 1 to 5, this invention provides an actuator structure including:

a first-half cylinder 10;

a second-half cylinder 20, wherein the first-half cylinder 10 and the second-half cylinder 20 are formed in the same mold and when the first-half cylinder 10 and the second-half cylinder 20 are engaged with each other, a complete actuator is formed. Each of the first-half cylinder 10 and the second-half cylinder 20 has an air reservoir chamber 30 and a vane chamber 40, wherein a volume ratio between the air reservoir chamber 30 and the vane chamber 40 is about three to one. A dividing unit 50 is formed between the air reservoir chamber 30 and the vane chamber 40, and the dividing unit 50 forms an angle of between 110 and 130 degrees in the vane chamber 40 which has protruding arc portions 11 and 21 to reduce the volume, so that the volume ratio between the air reservoir chamber 30 and vane chamber 40 can remain three to one to increase an effective moving area of a vane 60, and more specifically to focus the effective moving area of the vane 60 on one of the blades of the vane 60. The vane 60 is inside the vane chamber 40. A first channel groove 13 and a second channel groove 23 are formed at interfaces 12, 22 of the first-half cylinder 10 and the second-half cylinder 20, to connect a first air inlet hole 14 and a second air inlet hole 24 (at periphery of the first-half cylinder 10 and the second-half cylinder 20), and a left-side wall 41 and a right-side wall 42 of the vane chamber 40. One or more grooves 62 for a O-shaped ring 70 to prevent leakage are formed at a surface of the vane 60, both sides of a vane axis 61 and a lateral surface of the vane axis 61 closed to the dividing unit 50; and a fail-safe control structure 80, including an air source 81 connected to a non-return valve 82 and a first control side 831 of an air driving valve 83. The non-return valve 82 is connected to an inlet end 311 of an inlet hole 31 of the air reservoir chamber 30 and through an output end 312 to the air reservoir chamber 30, and inputted from an input end 321 of an outlet hole 32 of the air reservoir chamber 30 to an air inlet end 832 of the air driving valve 83 through another output end 322. The air driving valve 83 has a second control side 833 which has a spring 834, and a first output end 835 of the air driving valve 83 is connected to a second air inlet hole 24 of the actuator through a first channel 84, while a second output end 836 of the air driving valve 83 is connected to a first air inlet hole 14 of the actuator through a second channel 85, wherein the air source 81 provides air (as shown in FIG. 4) and the high-pressure air is reserved at the air reservoir chamber 30 through the non-return valve 82, and meanwhile the high-pressure air reaches the first control side 831 of the air driving valve 83 to drive the air driving valve 83 toward the second control side 833 to connect the air inlet end 832 and the first output end 835, so that the high-pressure air reserved in the air reservoir chamber 30 enters the vane chamber 40 through the outlet hole 32, the air inlet end 832, the first output end 835, the second air inlet hole 24 and the second channel groove 23, to further drive the vane 60 to spin, and the air on the other side of the vane 60 is exhausted to the atmosphere through the first channel groove 13, the second channel 85 and the second output end 836, and wherein the air source 81 does not provide air (as shown in FIG. 4-1) and there is no pressure on the first control side 831 of the air driving valve 83 and the spring 834 can be rebounded to drive the air driving valve 83 towards the first control side 831. By switching the position of the inlet air, the air inlet end 832 is aligned with the second output end 836, and the air reservoir chamber 30 with reserved gas drives the vane 60 in the vane chamber 40 through the outlet hole 32, the air inlet end 832, the second output end 836, the second channel 85, the first air inlet hole 14 and the first channel groove 13.

Screws 15 and 25 are passed through an outer periphery of the first-half cylinder 10 and the second-half cylinder 20. The screws 15 and 25 can penetrate to the vane chamber 40, and a front end of each screw 15 and 25 is used to block the vane 60 to control a rotating angle of the vane 60.

An outer portion of the O-shaped ring 70, which is located at a peripheral surface of the vane 60, has two elastic stopping edges 71 and 72 towards two free ends. These two stopping edges 71 and 72 are located at the inner surface of the actuator by utilizing means of line contact erosion.

The pressure in the air reservoir chamber 30 is decreasing, so the volume ratio between the air reservoir chamber 30 and the vane chamber 40 has to remain three to one to preserve enough gas pressure to drive the vane 60.

The force applied to a vane axis 61 from further end of the vane 60 cancels out with the force from close end of the vane 60.

Figure 6:
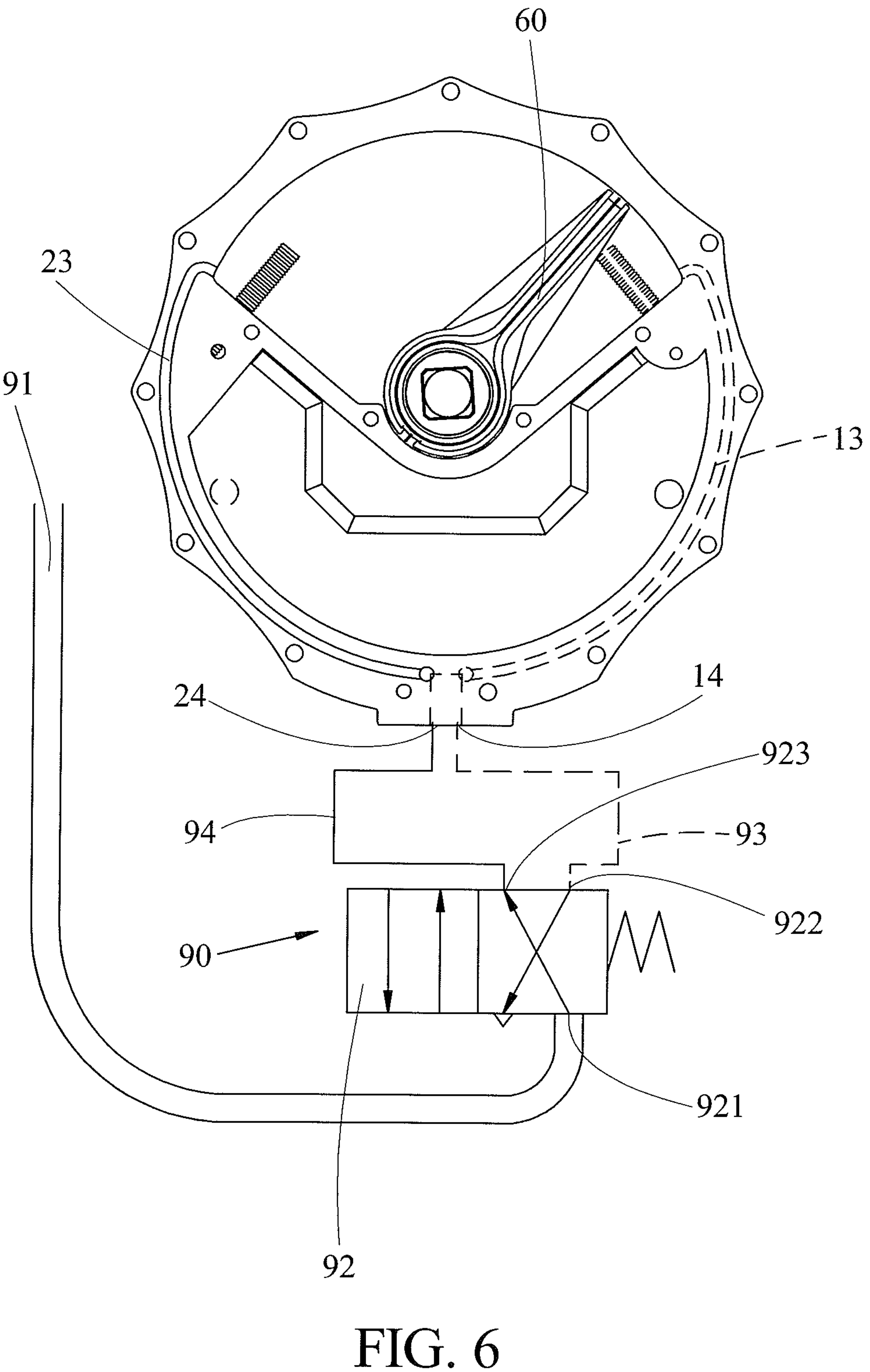
FIG. 6 illustrates a schematic view of an electro-magnetic valve of a dual-movement actuator in the present invention.
Figures 1, 6:
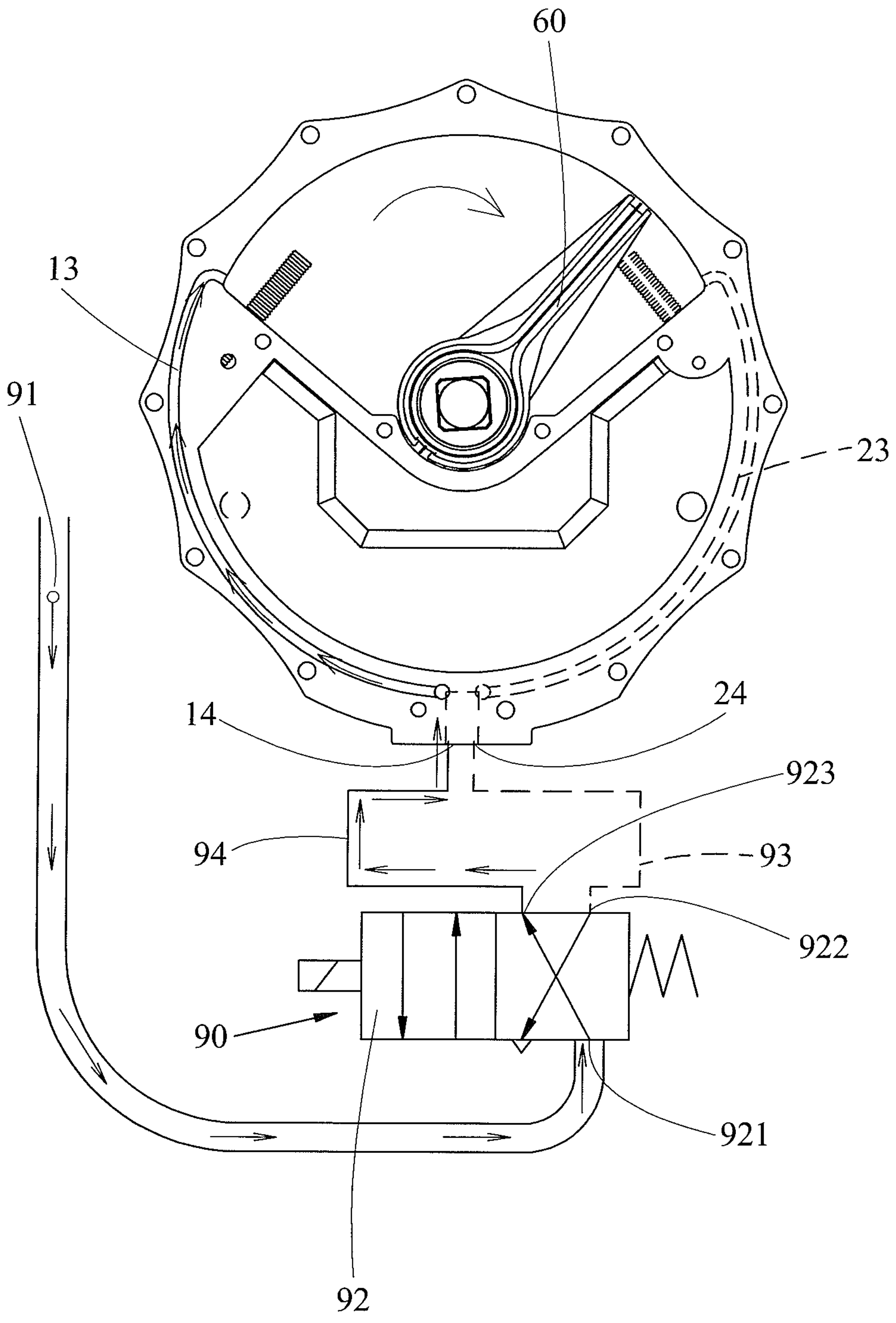

Referring to FIGS. 1 to 6, the present invention provides another embodiment as shown in FIGS. 6 and 6-1, including:

a dual-movement control structure 90 of the abovementioned actuator, including an air source 91 connected to an air inlet end 921 of an electro-magnetic valve 92 and the movement of the electro-magnetic valve 92 is controlled by electro-magnetic valve units, wherein a first outlet end 922 of the electro-magnetic valve 92 is connected to the second air inlet hole 24 of the actuator through a first channel 93, while a second outlet end 923 of the electro-magnetic valve 92 is connected to the first air inlet hole 14 of the actuator through a second channel 94, wherein the air source 91 provides air (as shown in FIG. 6) and the electro-magnetic valve units are actuated to drive the electro-magnetic valve 92 towards the right side to further connect the air inlet end 921 and the first output end 922, so that the high-pressure air from the air source 91 can enter the vane chamber 40 to drive the vane 60 through the air inlet end 921, the first output end 922, the first channel 93, the second air inlet hole 24 and the second channel groove 23. The air on the other side of the vane 60 is exhausted to the atmosphere through the first channel groove 13, the second channel 94 and the second output end 923, and wherein the air source 91 continues to provide air (as shown in FIG. 6-1) and the electro-magnetic valve units of the electro-magnetic valve are not actuated, so the spring can be rebounded to drive the electro-magnetic valve 92 towards the left side. By switching the position of the inlet air, the air inlet end 921 is aligned with the second output end 923, and the high-pressure air from the air source 91 enters the vane chamber 40 to drive the vane 60 through the air inlet end 921, the second output end 923, the second channel 94, the first air inlet hole 14 and the first channel groove 13.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. An actuator structure, comprising:

a first-half cylinder;

a second-half cylinder, which is made respectively in the same mold as the first-half cylinder and when the first-half cylinder and the second-half cylinder are engaged with each other, a complete actuator is formed, wherein each of the first-half cylinder and the second-half cylinder has an air reservoir chamber and a vane chamber, and a dividing unit is located between the air reservoir chamber and the vane chamber to form an angle of between 110 and 130 degrees in the vane chamber which has protruding arc portions to reduce the volume and to focus the effective moving area of the vane on one of the blades thereof, and the vane is located in the vane chamber, wherein a first channel groove and a second channel groove are formed at an interface of the first-half cylinder and the second-half cylinder, to connect a first air inlet hole and a second air inlet hole (at periphery of the first-half cylinder and the second-half cylinder), and a left-side wall and a right-side wall of the vane chamber, wherein one or more grooves for a O-shaped ring to prevent leakage are formed at a surface of the vane, both sides of a vane axis and a lateral surface of the vane axis closed to the dividing unit; and a fail-safe control structure, including an air source connected to a non-return valve and a first control side of an air driving valve, and the non-return valve is connected to the air reservoir chamber of the actuator, while the air reservoir chamber containing high-pressure gas is connected to an air inlet end of the air driving valve, and the air driving valve has a second control side which has a spring, wherein the first output end of the air driving valve is connected to a second air inlet hole through a first channel and connected to a right-side wall of the vane chamber through the second channel groove, while a second output end of the air driving valve is connected to a first air inlet hole through a second channel and connected to a left-side wall of the vane chamber through the first channel groove, wherein the air source provides air to drive the air driving valve and the vane, and when the air source does not provide air, the spring rebounds to actuate the air driving valve; and the high-pressure air in the air reservoir chamber drives the vane and safely restore it by switching movement to change the inlet air position.

2. The actuator structure of claim 1, wherein screws are passed through an outer periphery of the first-half cylinder and the second-half cylinder respectively; and the screws penetrate the vane chamber, and a front end of each screw is used to block the vane to control a rotating angle of the vane.

3. The actuator structure of claim 1, wherein an outer portion of the O-shaped ring, which is located at a peripheral surface of the vane, has two elastic stopping edges towards two free ends, said two stopping edges located at the inner surface of the actuator by utilizing means of linear contact erosion.

4. The actuator structure of claim 1, wherein volume ratio of the air reservoir chamber and the vane chamber is three to one.

5. An actuator structure, comprising:

a first-half cylinder a second-half cylinder, which is made respectively in the same mold as the first-half cylinder and when the first-half cylinder and the second-half cylinder are engaged with each other, a complete actuator is formed, wherein each of the first-half cylinder and the second-half cylinder has an air reservoir chamber and a vane chamber, and a dividing unit is located between the air reservoir chamber and the vane chamber to form an angle of between 110 and 130 degrees in the vane chamber which has protruding arc portions to reduce the volume and to focus the effective moving area of the vane on one of the blades thereof, and the vane is located in the vane chamber, wherein a first channel groove and a second channel groove are formed at an interface of the first-half cylinder and the second-half cylinder, to connect a first air inlet hole and a second air inlet hole (at periphery of the first-half cylinder and the second-half cylinder), and a left-side wall and a right-side wall of the vane chamber, wherein one or more grooves for a O-shaped ring to prevent leakage are formed at a surface of the vane, both sides of a vane axis and a lateral surface of the vane axis closed to the dividing unit; and a dual-movement control structure, including an air source connected to an air inlet end of an electro-magnetic valve and movement of the electro-magnetic valve is controlled by electro-magnetic valve units, wherein a first outlet end of the electro-magnetic valve is connected to the second air inlet hole of the actuator through a first channel and to a right-side wall of the vane chamber through the second channel groove, while a second outlet end of the electro-magnetic valve is connected to the first air inlet hole of the actuator through a second channel and to a left-side wall of the vane chamber through the first channel groove, wherein when the air source provides air and the electro-magnetic valve unit is actuated, the electro-magnetic valve is driven to move and the air can cause the shaft to rotate; and when the electro-magnetic valve unit is actuated in an opposite direction, the electro-magnetic valve is moved and the high-pressure air (from the air source) drives the vane to restore to its original position.

6. The actuator structure of claim 5, wherein screws are passed through an outer periphery of the first-half cylinder and the second-half cylinder; and the screws penetrate the vane chamber, and a front end of each screw is used to block the vane to control a rotating angle of the vane.

7. The actuator structure of claim 5, wherein an outer portion of the O-shaped ring, which is located at a peripheral surface of the vane, has two elastic stopping edges towards two free ends, said two stopping edges located at the inner surface of the actuator by utilizing means of linear contact erosion.

8. The actuator structure of claim 5, wherein volume ratio of the air reservoir chamber and the vane chamber is three to one.

* * * * *

UNITED STATES PATENT AND TRADEMARK OFFICE
CERTIFICATE OF CORRECTION

PATENT NO. : 8,671,672 B2
APPLICATION NO. : 12/993504
DATED : March 18, 2014
INVENTOR(S) : James Wang et al.

It is certified that error appears in the above-identified patent and that said Letters Patent is hereby corrected as shown below:

Title page, item (73), cancel "Easy Tork Automation Corporation, Yong Wun Village (TW)" and substitute therefore --Easytork Automation Corporation, Saint Louis, Missouri 63114--.

Signed and Sealed this
Twentieth Day of May, 2014

Michelle K. Lee

Michelle K. Lee
*Deputy Director of the United States Patent and Trademark Office*